Patented Aug. 2, 1938

2,125,685

UNITED STATES PATENT OFFICE 2,125,685

POLYMERIZATION PRODUCTS AND PROCESS OF PREPARING THEM

Otto Nicodemus, Heinrich Lange, and Otto Horn, Frankfort-on-the-Main-Hochst, Germany, assignors to I. G. Farbenindustrie Aktiengesellschaft, Frankfort-on-the-Main, Germany No Drawing. Application March 9, 1936, Serial No. 67,996. In Germany March 16, 1935

10 Claims. (Cl. 260—2)

The present invention relates to polymerization porducts and a process of preparing them.

It is known to transform into polymerization products compounds of the type of the butadienes-1.3, for instance the chlorine derivatives of these bodies, by a suitable treatment with heat or by the application of catalysts. By the polymerization there are obtained either highly polymeric substances of rubber- or resinlike properties or there are obtained low polymeric compounds having a more saturated, perhaps even a ringshaped constitution, but which at all events cannot further be polymerized as, for instance, the dimerides obtainable from chlor-2-butadiene-1.3.

Now we have found that, in contradistinction to the above said, the homologues and substitution products of the butadiene-1.2, that are bodies of the type of allene, may be transformed by a polymerization into new substances of raised molecular weight. The polymerization may be carried out by the action of light, heat or catalysts with or without an increased pressure in such a manner that each of the named means may be applied alone or in any combination. According to the operating conditions there may be obtained either low polymeric compounds or high polymeric compounds during which operation, for instance, in contradistinctions to the dimerides of chlor-2-butadiene-1.3, the dimerides obtainable from chlor-4-butadiene-1.2 by a gentle polymerization may be further polymerized in known manner either per se or in a mixture with other bodies.

In order to retain the low degree of polymerization it may sometimes be suitable to add in a certain phase of the reaction or during a possible distillation small quantities of polymerization retarders, for instance hydroquinone, pyrocatechin, amines, copper and others. The reaction may be carried out both continuously and discontinuously with and without an excess pressure.

The low polymeric compounds obtained according to this method of operating are well defined and in many cases distillable bodies. They show the remarkable property of forming, as self-drying oils, colorless coatings.

As an excess pressure there may be applied about 1 to 250 atmospheres.

The following examples serve to ilustrate the invention but they are not intended to limit it thereto:

1. Chlor-4-butadiene-1.2 is kept boiling for 48 hours on the reflux condenser with exclusion of air. The chlor-4-butadiene-1.2 which has not reacted is then distilled and the residue is distilled under a reduced pressure. At 95° C. to 100° C. and under a pressure of 10 millimeters of mercury a colorless, strongly refractive and terpenelike smelling substance distils which is a dimeric chlormethylallene ($C_8H_{10}Cl_2$). This chlormethylallene may be used either as self-drying oil or it may be polymerized according to known methods so as to obtain excellent products.

2. Chlor-4-butadiene-1.2 is heated for 65 hours with application of pressure to 100° C. A viscous highly polymeric product is obtained which can no longer be distilled. But it may be further polymerized in known manner.

3. Chlor-4-butadiene-1.2 is passed in a cycle through a reaction vessel which is maintained at 90° C. and is then condensed in a condenser. The condensate is extracted by boiling and returned into the cycle. The residue which consists for the most part of dimeric chlormethylallene is worked up as described in Example 1.

4. The hydroxy-4-butadiene-1.2 (boiling point at 68° C. to 70° C. under a pressure of 53 millimeters) obtained by the action of sodium carbonate in an aqueous solution on chlormethylallene is kept boiling for 48 hours on the reflux condenser with exclusion of air. The hydroxy-4-butadiene-1.2 which has not reacted is distilled. A viscous highly polymeric product is obtained which may be further polymerized in known manner.

5. The methoxy-4-butadiene-1.2 (boiling point 40° C. under a pressure of 100 millimeters) obtained by the action of methyl iodide on the sodium compound of hydroxymethylallene is kept boiling for 6 hours on the reflux condenser in the presence of a trace of metallic sodium. After the distillation of the methoxy-4-butadiene-1.2 which has not reacted a viscous highly polymeric product is obtained which may be further polymerized in known manner.

6. The aceto-4-butadiene-1.2 (boiling point 85° C. to 86° C. under a pressure of 125 millimeters) obtained by the action of sodium acetate on chlormethylallene is kept boiling for 3 hours on the reflux condenser in the presence of a small quantity of benzoylperoxide. After the distillation of the aceto-4-butadiene-1.2 which has not reacted a viscous highly polymeric product is obtained which may be further polymerized in known manner.

7. The cyano-4-butadiene-1.2 (boiling point 68° C. under a pressure of 80 millimeters) obtained by the action of chlormethylallene on potassium cyanide is heated for 24 hours to about 80° C. under a pressure of 50 atmospheres. After the distillation of the cyano-4-butadiene-1.2 which has not reacted a highly viscous polymerization product is obtained which may be further polymerized in known manner.

8. The mercapto-4-butadiene-1.2 (boiling point 50° C. to 52° C. under a pressure of 80 millimeters) obtained by the action of chlormethylallene on sodium sulfhydrate is kept boiling for 5 hours, in the presence of a small quantity of potassium. A solid polymerization product is obtained during this operation.

9. The phenoxy-4-butadiene-1.2 (boiling point 90° C. to 95° C. under a pressure of 10 millimeters) obtained by the action of chlormethylallene on sodium phenolate is kept boiling for 48 hours. The phenoxy-4-butadiene-1.2 which has not reacted is distilled. A resinous polymerization product is obtained during this operation.

10. The n-butylamino-4-butadiene-1.2 (boiling point 54° C. to 55° C. under a pressure of 7 millimeters) obtained by the action of chlormethylallene on n-butylamine is kept boiling for 48 hours on a reflux condenser with exclusion of air. The n-butylamino-4-butadiene-1.2 which has not reacted is distilled. A highly viscous polymerization product is obtained which may be further polymerized in known manner.

11. The diethylamino-4-butadiene-1.2 (boiling point 31° C. to 33° C. under a pressure of 8 millimeters) obtained by the action of chlormethylallene on diethylamine is exposed for 48 hours to the action of ultra-violet light. After the distillation of the diethylamino-4-butadiene-1.2 which has not reacted a viscous polymerization product is obtained which may be further polymerized in known manner.

12. Methylmercapto-4-butadiene-1.2 (boiling point 72° C. under a pressure of 100 millimeters) obtained by the action of sodium-methylmercapto on chlormethylallene polymerizes by heating it for 12 hours in the presence of benzoylperoxide so that a viscouse polymerization product is obtained.

We claim:

1. The process which comprises polymerizing a 4-substitution product of butadiene-1.2 by heating the monomeric material to about its boiling point for at least about 24 hours.

2. The process which comprises polymerizing a 4-substitution product of butadiene-1.2 by heating the monomeric material to about its boiling point for at least about 24 hours while applying pressure.

3. The process which comprises polymerizing a 4-substitution product of butadiene-1.2 by heating the monomeric material to about its boiling point for at least about 24 hours in the presence of a catalyst known to promote polymerizations.

4. The process which comprises polymerizing chlor-4-butadiene-1.2 by heating the monomeric material to about its boiling point for at least about 24 hours.

5. The process which comprises polymerizing methoxy-4-butadiene-1.2 by heating the monomeric material to about its boiling point for at least about 24 hours in the presence of metallic sodium.

6. The process which comprises polymerizing n-butylamino-4-butadiene-1.2 by heating the monomeric material to about its boiling point for at least about 24 hours.

7. Polymerized 4-substitution products of butadiene-1.2 which are substantially identical with the product obtained by the process defined in claim 1, said products being of oily to resinous character.

8. Polymerized dimeric chlor-4-butadiene-1.2 which is substantially identical with the product obtained by the process defined in claim 4, said product being an oily colorless liquid capable of being further polymerized.

9. Polymerized methoxy-4-butadiene-1.2, which is substantially identical with the product obtained by the process defined in claim 5, said product being viscous and capable of being further polymerized.

10. Polymerized n-butylamino-4-butadiene-1.2, which is substantially identical with the product obtained by the process defined in claim 6, said product being viscous and capable of being further polymerized.

OTTO NICODEMUS.
HEINRICH LANGE.
OTTO HORN.